O. M. SMITH.

Assignor to S. W. Evans, and S. W. Evans, Jr.

UMBRELLA TIP-CUP.

No. 7,572. Reissued March 27, 1877

WITNESSES

Franck. L. Quand

Frank Gall

INVENTOR

Owen M. Smith

Alexander Wilson

ATTORNEYS

N. PETERS, PHOTO-LITHOGRAPHER, WASHINGTON, D. C.

UNITED STATES PATENT OFFICE.

ORREN M. SMITH, OF FRANKFORD, PENNSYLVANIA, ASSIGNOR TO SAMUEL W. EVANS AND SAMUEL W. EVANS, JR., (DOING BUSINESS AS S. W. EVANS & SON,) OF SAME PLACE.

IMPROVEMENT IN UMBRELLA TIP-CUPS.

Specification forming part of Letters Patent No. 185,357, dated December 12, 1876; reissue No. 7,572, dated March 27, 1877; application filed February 19, 1877.

*To all whom it may concern:*

Be it known that I, ORREN M. SMITH, of Frankford, in the county of Philadelphia and State of Philadelphia, have invented certain new and useful Improvements in Umbrella Tip-Cups and Tip-Cup Runners; and I do hereby declare that the following is a full, clear, and exact description thereof, reference being had to the accompanying drawings, and to the letters of reference marked thereon, which form a part of this specification.

The nature of my invention consists in the construction and arrangement of the parts of a tip-cup and stick-tube or tip-cup runner for umbrellas, in such manner that the tip-cup will be held to the tube or tip-cup runner by friction sufficient to cause the cup to remain upon the tube or runner wherever placed; also, in the construction of a tip-cup of one piece of metal, whereby an end is partially closed, as will be hereinafter more particularly set forth.

In order to enable others skilled in the art to which my invention appertains to make and use the same, I will now proceed to describe its construction and operation, referring to the annexed drawings, in which—

Figure 1:
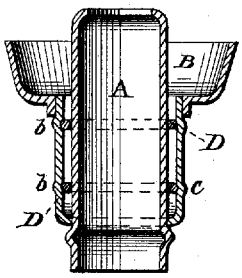
Figure 2:
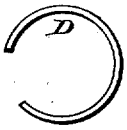
Figure 3:
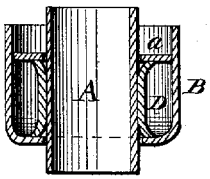
Figure 4:
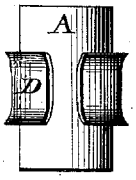

Figure 1 is a longitudinal section of a tip-cup and tube illustrating one form of my invention. Figs. 2 and 4 show, respectively, top and side views of a modified form of spring, and Fig. 3 is a section, showing a single spring, or a tube having flaring edges—that is, a tubular spring.

A represents the sleeve or tube, which forms the body of the runner, or which may be on a ferrule, fastened to the staff of the umbrella. B is the tip-cup sliding directly upon the tube A, or provided with a tubular extension, C, sliding thereon. This cup is formed of a single piece of metal, and is struck up by dies, so that the outer end is partially closed, leaving just sufficient room for the stick to pass through. It will be seen that a washer is thus formed at the end of the cup, having its face at right angles to the inner or outer circumference of the body of the cup. The cup may be made with a closed end, and then cut out to fit the stick; or it may be struck up from blanks having the holes already in them. D represents a spring interposed between the tube A and the cup B, or its extension C, to create friction, and thereby hold the cup in any desired position on the tube A. This spring D may be made of flat spring-metal, of suitable length, encircling the tube A, and held by the end of the cup, and the washer *a* fastened in said cup; or such spring may be simply a piece of spring-wire, flat or round, and inserted or sprung into grooves or knurls *b* on the extension C, as shown in Fig. 1.

I do not confine myself to any particular form or number of springs, as anything which will create friction between the parts will answer the purpose of my invention.

Having thus fully described my invention, what I claim as new, and desire to secure by Letters Patent, is—

1. A friction spring or springs interposed between the tube A and the tip-cup or its tubular extension, as and for the purpose specified.

2. An umbrella tip-cup and tube or tip-cup runner, in frictional-spring contact with each other, for the purpose holding the cup at any desired position on the tube, as set forth.

3. An umbrella tip-cup and tube or tip-cup runner, having metal or other suitable material interposed between the stick-tube or tip-cup runner and the tip-cup, and adapted to produce spring friction, for keeping the cup in place, substantially as set forth.

4. A tip-cup struck up from one piece of metal, having a washer formed at one end, the face of which shall be at right angles to the inner or outer circumference of the body of the tip-cup, substantially as described.

In testimony that I claim the foregoing I have hereunto set my hand this 1st day of February, 1877.

ORREN M. SMITH.

Witnesses:
FRANK GALT,
J. M. MASON.